United States Patent
Smith et al.

(10) Patent No.: US 10,360,284 B1
(45) Date of Patent: Jul. 23, 2019

(54) STATISTICAL FACILITY MONITOR

(71) Applicant: Applied Underwriters, Inc., Omaha, NE (US)

(72) Inventors: Justin N. Smith, Woodside, CA (US); Mark S. Nowotarski, Stamford, CT (US)

(73) Assignee: Applied Underwriters, Inc., Omaha, NE (US)

( * ) Notice: Subject to any disclaimer, the term of this patent is extended or adjusted under 35 U.S.C. 154(b) by 145 days.

(21) Appl. No.: 15/600,816

(22) Filed: May 22, 2017

(51) Int. Cl.
| | | |
|---|---|---|
| *G06F 17/50* | (2006.01) | |
| *G06F 17/18* | (2006.01) | |
| *G01D 4/14* | (2006.01) | |
| *G06F 16/487* | (2019.01) | |
| *G06F 16/48* | (2019.01) | |
| *G06Q 50/06* | (2012.01) | |
| *G06Q 50/10* | (2012.01) | |
| *G06Q 50/08* | (2012.01) | |
| *G06Q 50/04* | (2012.01) | |

(52) U.S. Cl.
CPC .............. *G06F 17/18* (2013.01); *G01D 4/14* (2013.01); *G06F 16/487* (2019.01); *G06F 16/489* (2019.01); *G06Q 50/04* (2013.01); *G06Q 50/06* (2013.01); *G06Q 50/08* (2013.01); *G06Q 50/10* (2013.01)

(58) Field of Classification Search
USPC ................................ 703/2; 700/38, 108, 276
See application file for complete search history.

(56) References Cited

U.S. PATENT DOCUMENTS

| | | |
|---|---|---|
| 6,816,811 B2 | 11/2004 | Seem |
| 7,908,157 B1 | 3/2011 | Menzies et al. |
| 8,175,830 B2 | 5/2012 | Hosking |
| 8,200,345 B2 * | 6/2012 | Li ............................. G05B 5/01 700/38 |
| 8,340,922 B2 | 12/2012 | Wang et al. |
| 8,532,839 B2 * | 9/2013 | Drees ...................... G05B 15/02 700/108 |
| 8,756,024 B2 * | 6/2014 | Hedley .................. G06Q 30/02 702/60 |
| 9,080,529 B1 | 7/2015 | Klughart |
| 9,639,413 B2 * | 5/2017 | Drees ...................... G05B 15/02 |

(Continued)

OTHER PUBLICATIONS wikipedia.com, Grubbs' test for outliers, https://en.wikipedia.org/wiki/Grubbs'_test_for_outliers, Feb. 16, 2017.

(Continued)

*Primary Examiner* — Thai Q Phan
(74) *Attorney, Agent, or Firm* — Mark Nowotarski

(57) ABSTRACT

A statistical facility monitor has a consumption percentile meter. The consumption percentile meter reads in utility consumption data from a monitored facility over a period of time. The consumption percentile meter then reads in a cumulative distribution of consumption percentile versus normalized utility consumption for similar reference facilities. The cumulative distribution is based on other facilities in the same facility class as the monitored facility. The consumption percentile meter uses the cumulative distribution to determine the consumption percentile for the monitored facility relative to the reference facilities. The meter then outputs the consumption percentile.

19 Claims, 9 Drawing Sheets

(56) References Cited

U.S. PATENT DOCUMENTS

| | | |
|---|---|---|
| 9,703,287 B2* | 7/2017 | Arensnneier ...... G05B 23/0224 |
| 9,933,762 B2* | 4/2018 | Marti ..................... G05B 15/02 |
| 2012/0022700 A1* | 1/2012 | Drees ..................... G05B 15/02 |
| | | 700/276 |

OTHER PUBLICATIONS

Coyote Blog, Dispatches from District 48, Beware Applied Underwriters Workers Compensation Insurance, dated Apr. 9, 2015, http://coyoteblog.com/coyote_blog/2015/04/beware-applied-underwriters-workers-compensation-insurance.html, last viewed Aug. 9, 2016.

R.L. Bornhuetter and R.E. Ferguson, The Actuary and IBNR, last viewed Aug. 9, 2016.

Dan Corro, NCCI, Trending Entry Ratio Tables, dated Sep. 2005, last viewed Aug. 1, 2016.

Eversource Energy, Home Energy Report dated Feb. 23, 2017, last viewed Mar. 20, 2017.

Howard C. Mahler, Workers Compensation Excess Ratios: An Alternative Method of Estimation, last viewed Aug. 1, 2016.

Jeremiah Howard, Insurance Journal, Workers' Comp: An Introductory View into Loss Sensitive Plans, dated May 23, 2005, https://www.insurancejournal.com/magazines/features/2005/05/23/56160.htm, last viewed Aug. 9, 2016.

* cited by examiner

US 10,360,284 B1

STATISTICAL FACILITY MONITOR

FIELD OF THE INVENTION

Embodiments of the present invention relate to statistical measurement.

BACKGROUND OF THE INVENTION

FIG. 1 illustrates a prior art distributed facility management system 100. FIG. 1 is based on modified versions of FIGS. 1 and 3 of U.S. Pat. No. 6,816,811 "Method of Intelligent Data Analysis to Detect Abnormal Use of Utilities in Buildings" (Seem). The prior art system comprises a central computer system 102 and a communications network 110 in communication with a plurality of building management systems 112 located in a plurality of facilities 104, 106 and 108. The system reads in utility data from one or more utility monitors 114 in a building. The system then classifies said utility data into normal 122 and anomaly 124 data. In order to determine if data is normal or an anomaly, the system computes an extreme studentized deviate based on the value of each data point and the mean and standard deviation for the set of data read in from the particular monitor in the particular monitored building. A percentile for each data point is computed for each extreme studentized deviate. If the percentile is extreme, then the data point is characterized as an anomaly. As used herein, a "percentile" is a value of a cumulative distribution that indicates what percentage of a reference population used to determine the cumulative distribution is less than a given value. Percentile may be expressed as a percentage (e.g. 0 to 100) or a fraction (e.g. 0 to 1.0). It may also be expressed as an equal division of a whole, such as a quartile, quintile or higher order division.

The Seem system has a number of significant flaws. The extreme studentized deviate is based on the assumption that the data are normally distributed, random numbers which are independent of each other. This is clearly not the case for the examples provided in Seem. The data characterized as normal 122 by Seem is not random, but periodic. Hence Seem's fundamental assumption of random and independent data is not true. This may account for the false warnings Seem experiences (Seem column 4 line 33). An additional flaw of Seem is that there is no way to compare the utility consumption of one building to another. Building 104 might be a residential facility. Building 106 might be a retail facility. Building 108 might be a manufacturing facility. One would not expect facilities in these different facility classes (e.g. industrial classes) to have comparable utility consumption patterns. Even if all facilities were in the same facility class, however, it still would not be possible to compare facilities of substantially different sizes 125. Two apartment buildings, for example, might have very different utility usage patterns if one had 2 apartments and the other had 100 apartments.

There is a need, therefore, for a system and method for comparing different facilities to determine how the facilities compare to a norm relative to their facility class and size.

SUMMARY OF THE INVENTION

The summary of the invention is provided as a guide to understanding the invention. It does not necessarily describe the most generic embodiment of the invention or the broadest range of alternative embodiments.

The inventions described herein are broadly applicable. To illustrate the range of applicability of said inventions, examples in the field of fuel consumption monitoring as well as examples in the field of lost wages and medical expenses monitoring (e.g. workers' compensation losses) are described herein.

FIG. 2 is a schematic of a system 200 for statistical facility monitoring. The system comprises a computer implemented consumption percentile meter 202. The consumption percentile meter reads in 211 utility consumption data from a monitored facility 210 over a monitored time period 217. As used herein, a "monitored facility" may comprise a single building, a plurality of buildings (e.g. an office complex), regions within buildings (e.g. an apartment) and outdoor locations (e.g. an area being landscaped). As used herein, "reads in" may include data transmitted directly from a device and data entered manually into a system. All communications described herein may be via electronic communication systems such as the Internet, WAN, cell phone systems, hard wired systems, and machine to machine (M2M) systems.

The consumption percentile meter also reads in 251 data suitable for determining a utility class 216 for said utility being monitored, a facility class 214 for said monitored facility, a temporal class 213 for said utility being monitored, a duration 215 of the monitored time period 217, a size 212 for said monitored facility and an expected average unit consumption rate 219 for said monitored utility.

A utility class says what type of utility is being monitored. A utility class may include "energy" (e.g. electricity, gas, coal, etc.), "materials" (e.g. raw materials and prefabricated sub-assemblies), "labor" 223, "capital costs" (e.g. construction, depreciation and maintenance), "insurance losses" (e.g. lost wages and medical expenses due to on-the-job injuries), and "monetary expenses" (e.g. dollars). Anything that is consumed over time may be described by a utility class. Units of consumption may be standardized within a utility class. Electricity and gas consumption, for example, may be standardized as energy units, such as kilowatt-hours. Raw materials and subassembly consumption may be standardized using monetary units, such as dollars. Labor may be standardized by time and pay rate, such as $/hr. Automated labor monitoring may be done with time clocks or other monitors of activity, such as workstation usage.

A facility class says what type of facility is being monitored (e.g. apartment, office, factory). Facility class may be determined by an industrial classification code for a facility (e.g. SIC or NAICS code).

The temporal class of a monitored utility indicates how the rate of consumption of the monitored utility varies over time in a monitored facility. Temporal classes include "steady consumption" (e.g. heater use), "periodic consumption" (e.g. daily heating cycle), "randomly initiated events" (e.g. backup generator usage due to loss of electric utility power) and other more complicated usage patterns such as "finite state machine cycles" (e.g. washing machine power draw). Randomly initiated events may be characterized by a probability of a random event occurring in a given time period and a distribution of magnitudes of consumption of a utility associated with each random event. The distribution of magnitudes may have an average value.

The monitored time period may be any time period of interest. The duration of the monitored time period is how long the monitored time period lasts. As will be indicated below, consumption of a monitored utility may be triggered during a monitored time period and continue past the end of the monitored time period. The period of additional consumption is called a tail period. The consumption during the tail period may be attributed to the monitored time period since the event that initiated the consumption occurred during the monitored time period. An example is fuel consumption for a backup generator. The backup generator may be initiated during a monitored time period due to electric power loss to the monitored facility. The fuel consumption of the backup generator may proceed past the end of the monitored time period and into a tail period depending upon how quickly electric power is restored to the monitored facility. Nonetheless, the fuel consumption by the backup generator during the tail period will be attributed to the monitored utility consumption during the monitored time period.

The size of the monitored facility is any physical parameter that indicates how much the expected consumption of the monitored utility will be for the monitored facility. Size can be based on one or more of physical size (e.g. square meters), capacity (e.g. power rating), and number of facility occupants (e.g. employees).

The expected average unit consumption rate of a monitored utility is the average unit rate of utility consumption for reference facilities in the same facility class and other classes (e.g. temporal class) as the monitored facility. To determine the average unit consumption rate for a set of reference facilities, each reference facility is monitored for a monitored time period. The measured utility consumption for each reference facility is then divided by the respective durations of the monitored time periods. This gives a consumption rate for each facility. The consumption rates are then summed and divided by the total combined sizes of all of the reference facilities. This gives an expected average unit consumption rate. Table 1 below gives a hypothetical example.

TABLE 1

Expected Average Unit Consumption Rate for Backup Generators for Hospitals
Temporal Class: Randomly Initiated Events

| Facility | Consumption (gallons) | Monitored Time Period Duration (years) | Consumption rate (gallons/year) | Size (# beds) |
|---|---|---|---|---|
| A | 10000 | 1 | 10000 | 1000 |
| B | 12000 | 1 | 12000 | 800 |
| C | 8000 | 1 | 8000 | 1200 |
| D | 8500 | 1 | 8500 | 900 |
| E | 13000 | 1 | 13000 | 1100 |
| Total | | | 51500 | 5000 |
| Expected average unit consumption rate (gallons/bed/year) | | | 10.3 | |

In this example, the facility class is "hospitals". The utility class is "backup generator fuel". The temporal class is "randomly initiated events". The size of each facility is based on the number of beds in the hospital. The monitored time periods are all 1 year. The consumption rate for each hospital is the total consumption of the monitored utility over each monitored time period divided by the duration of each monitored time period. The total consumption rate for all of the reference hospitals is the sum of the consumption rates for each hospital (e.g. 51500 gal/yr). The total size of all of the hospitals is the sum of all of the numbers of beds (e.g. 5000). The expected average unit consumption rate for the reference hospitals, therefore, is 10.3 gal/yr/bed.

In an additional refinement, different rooms within a hospital could be categorized into different types. These might include patient rooms, operating theatres, office space, etc. The individual power consumption for each room could be monitored during backup generator use. This can be converted to gallons of backup fuel used by each room using the specific output of the backup generator (e.g. kwh/gallon). The expected average unit consumptions for each room type within a hospital, therefore, could be calculated.

In a workers' compensation example, the utility being monitored is losses due to employee accident and injury. Each employee may be characterized by a workers' compensation labor class (e.g. office worker, maintenance worker, driver, etc.) Each labor class may have an associated expected average unit consumption rate of losses. This is also known as "expected loss rate". Office workers, for example, might have an expected loss rate of $0.30/$100 in payroll. The expected consumption of the monitored utility (e.g. losses) for each labor class would be the expected loss rate for each labor class times the payroll of all employees in said labor class. The total expected consumption for the monitored facility would be the sum of all of the expected consumptions for all of the labor classes.

Normalized Consumption

After the consumption percentile meter reads in 211 utility consumption data and the other data 251 related to the classes of the monitored facility, it determines a normalized consumption for the facility. The normalized consumption is the measured consumption for the monitored facility divided by the expected consumption for the monitored facility. The expected consumption for the monitored facility is the expected average unit consumption rate times the size of the facility times the duration of the monitored time period. If the monitored facility is composed of sub-facilities then the expected average consumption for each sub-facility is calculated and the total expected consumption of the monitored facility is set equal to the sum of the expected average consumptions for all of the sub-facilities. As used herein, "sub-facilities" includes workers' compensation labor classes.

For the temporal class of randomly initiated events the expected consumption can be calculated from:
a) a probability of said randomly initiated events occurring per unit time;
b) an average value for a distribution of magnitudes of consumption of said utility due to each randomly initiated event; and c) a duration of a monitored time period.

The expected consumption of the monitored utility is equal to the probability of the randomly initiated events occurring per unit time, times the average value of the distribution of magnitudes, times the duration of the monitored time period. If the probability of said randomly initiated events occurring per unit time is also expressed per unit size of said monitored facility, then the probability is multiplied by the size of the monitored facility.

Cumulative Distribution Data

Referring again to FIG. 2, the consumption percentile meter 202 may then query 201 a cumulative distribution database 204 to identify and read in 203 appropriate cumulative distribution data (CDF) 206. The consumption percentile meter may use one or more of the utility class, facility class, temporal class, duration of the monitored time period, and an expected consumption quantity class to identify the appropriate cumulative distribution data. The cumulative distribution data provides a consumption percentile versus normalized consumption. The consumption percentile is the percent of reference facilities in the same facility class, etc., as the monitored facility that have a normalized utility consumption that is less than or equal to a given value. Percentile can be expressed as percent (e.g. 0 to 100) or fraction (e.g. 0 to 1.0).

The cumulative distribution data may be determined from a set of reference facilities (e.g. 220, 230, 240) in the appropriate classes. In the hospital example above, the monitored utility consumption for the five reference hospitals could be used to develop cumulative distribution data for the facility class of "hospitals". Each reference facility provides utility consumption data (e.g. 221, 231, 241) to the cumulative distribution database 204. The cumulative distribution database then calculates a normalized consumption for each reference facility. The normalized consumption is the ratio of the measured consumption to the expected consumption. The expected consumption is based on the size of each reference facility, the duration of each monitored time period and the expected average unit consumption rate for all of the reference facilities. The normalized consumptions for the reference facilities are then sorted (e.g. low to high) to determine (e.g. 222, 232, 242) a consumption percentile associated with each normalized consumption. The consumption percentile versus normalized consumption then becomes the cumulative distribution data. Table 2 shows an example determination of cumulative distribution data for the hospital example in table 1.

TABLE 2

Cumulative Distribution Data for Backup Generators for Hospitals
Temporal Class: Randomly Initiated Events

| Facility | Consumption (gallons) | Monitored Time Period Duration (years) | Consumption rate (gallons/year) | Size (# beds) | Expected Consumption (gallons) | Normalized Consumption | Consumption Percentile (%) |
|---|---|---|---|---|---|---|---|
| C | 8000 | 1 | 8000 | 1200 | 12360 | 0.65 | 20 |
| D | 8500 | 1 | 8500 | 900 | 9270 | 0.92 | 40 |
| A | 10000 | 1 | 10000 | 1000 | 10300 | 0.97 | 60 |
| E | 13000 | 1 | 13000 | 1100 | 11330 | 1.15 | 80 |
| B | 12000 | 1 | 12000 | 800 | 8240 | 1.46 | 100 |
| Total | | | 51500 | 5000 | | | |
| Expected average unit consumption rate (gallons/bed/year) | | | 10.3 | | | | |

The facilities have been sorted from low normalized consumption to high normalized consumption and a consumption percentile has been assigned to each normalized consumption. The consumption percentile is 100 divided by the number of reference facilities times the rank order of each reference facility. Facility C, for example, has a rank order of 1. Facility D has a rank order of 2, and so on. The last two columns in table 2, therefore, are an example of cumulative distribution data.

Reference facilities used to create cumulative distribution data may be limited to a range of expected consumptions. This range is called an expected consumption quantity class. Cumulative distribution data will be more accurate if the reference facilities used to develop the cumulative distribution data all have expected consumptions within a given range. The range should be large enough so that there is an adequate number of reference facilities to develop the cumulative distribution data. An adequate number of reference facilities is 100 or more. In the field of workers' compensation, the expected consumption quantity classes are called "Expected Ultimate Loss Groups". Expected Ultimate Loss Groups each have a maximum and a minimum. The ratios of the maximums to the minimums are generally in the range of 1.08 to 1.6. Table M, provided by the National Counsel of Compensation Insurance, has cumulative distribution data for different Expected Ultimate Loss Groups.

A surprising advantage of using expected consumption quantity classes is that cumulative distribution data developed for reference facilities with a given duration of their monitored time periods can be used for monitored facilities with a different duration of their monitored time periods. In the hospital example above, for example, the duration of the monitored time periods of the reference facilities is one year. The expected consumption quantity class is 8,000 gallons to 13,000 gallons. The cumulative distribution data for these reference hospitals could be used for a smaller hospital if the monitored time period were long enough so that the expected consumption of the smaller hospital was in the range of 8,000 gallons to 13,000 gallons. For example, if the monitored hospital had an expected consumption rate of 3,000 gallons per year and the monitored time period was 3 years, the expected consumption of the smaller hospital for the monitored time period would be 9,000 gallons. This is in the range of 8,000 gallons to 13,000 gallons and hence the cumulative distribution data from these reference hospitals could be used.

Consumption Percentile for a Monitored Facility

After the consumption percentile meter reads in 203 the appropriate cumulative distribution data, it may then determine a consumption percentile 209 for the monitored facility 210 based on the normalized consumption 207 of the monitored facility and the cumulative distribution data 206. The consumption percentile meter may then output 262 the consumption percentile of the monitored facility.

The consumption percentile meter gives a user an indication of how the utility consumption of a monitored facility compares to the reference facilities in one or more of the same classes. Thus it has substantial utility over and above the prior art Seem system. It can be used to determine if the utility consumption of a monitored facility has departed from what is normal for its peers (e.g. the reference facilities). This may indicate a physical problem with the monitored facility, such as a need for maintenance.

The consumption percentile meter may be further useful for billing purposes. A facility may be billed based on how its consumption stacks up against its peers as opposed to being based directly on the consumption itself. A computer implemented facility billing module 260 may be provided. The facility billing module reads in the consumption percentile and generates a charge 264 for the monitored utility. The charge may be based on the consumption percentile and the expected consumption of the monitored facility. Examples are provided below.

The consumption percentile meter may also contribute 205 its normalized consumption data to the cumulative distribution database for incorporation into the cumulative distribution data. Thus a monitored facility may also be a reference facility.

DETAILED DESCRIPTION

The detailed description describes non-limiting exemplary embodiments. Any individual features may be combined with other features as required by different applications for at least the benefits described herein. As used herein, the term "about" means plus or minus 10% of a given value unless specifically indicated otherwise.

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

As used herein, a "computer implemented system" or the like comprises an input device for receiving data, an output device for outputting data in tangible form (e.g. printing or displaying on a computer screen), a permanent memory for storing data as well as computer code, and a digital processor for executing computer code wherein said computer code resident in said permanent memory will physically cause said digital processor to read-in data via said input device, process said data within said digital processor and output said processed data via said output device. Said digital processor may be a microprocessor. Said digital processor and permanent memory may have distributed forms, such as cloud-based processing or storage.

Method of Consumption Percentile Metering

Figure 1:
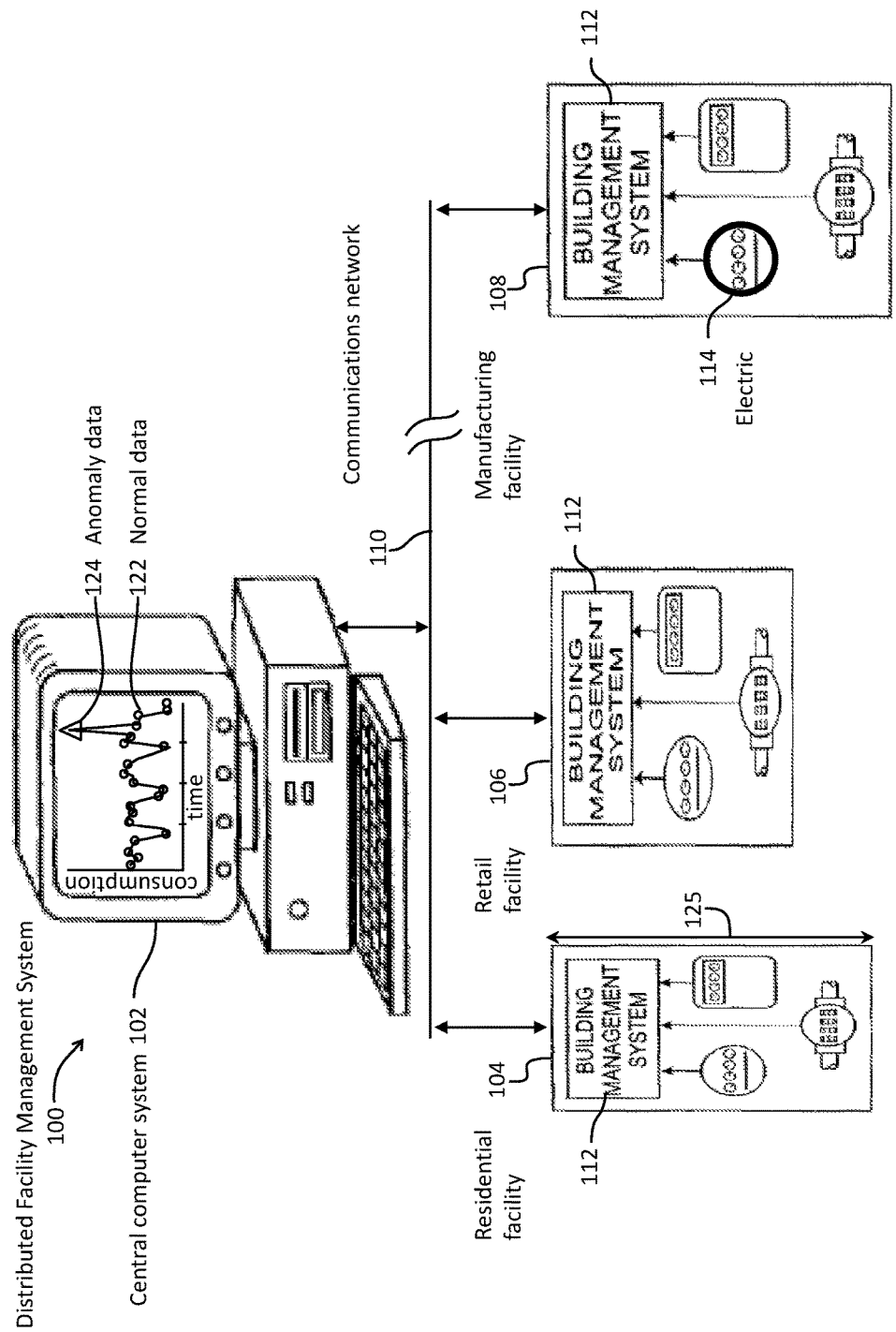
FIG. 1 is a schematic of a prior art distributed facility management system.
Figure 2:
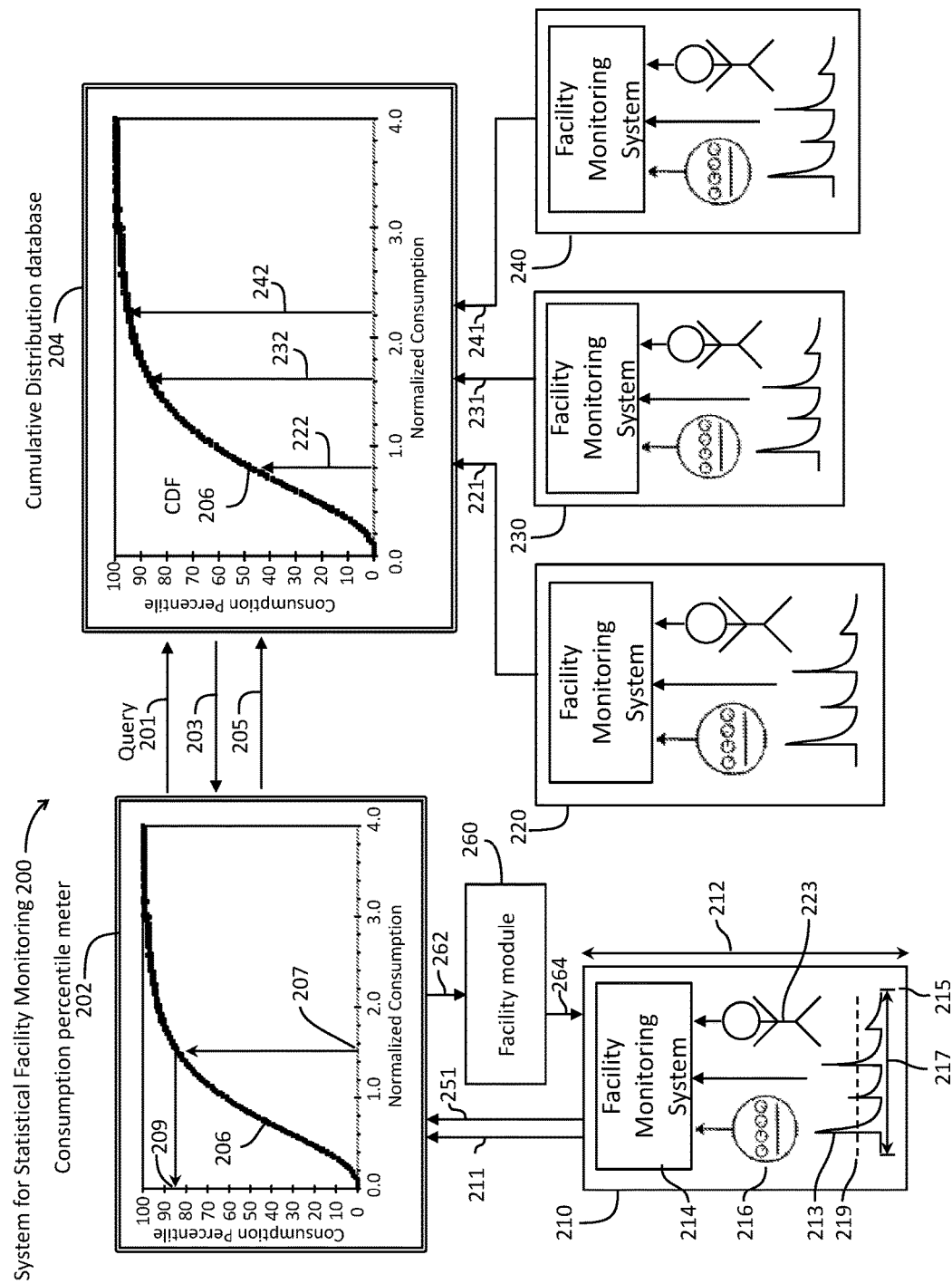
FIG. 2 is a schematic of a system for statistical facility monitoring.
Figure 3:
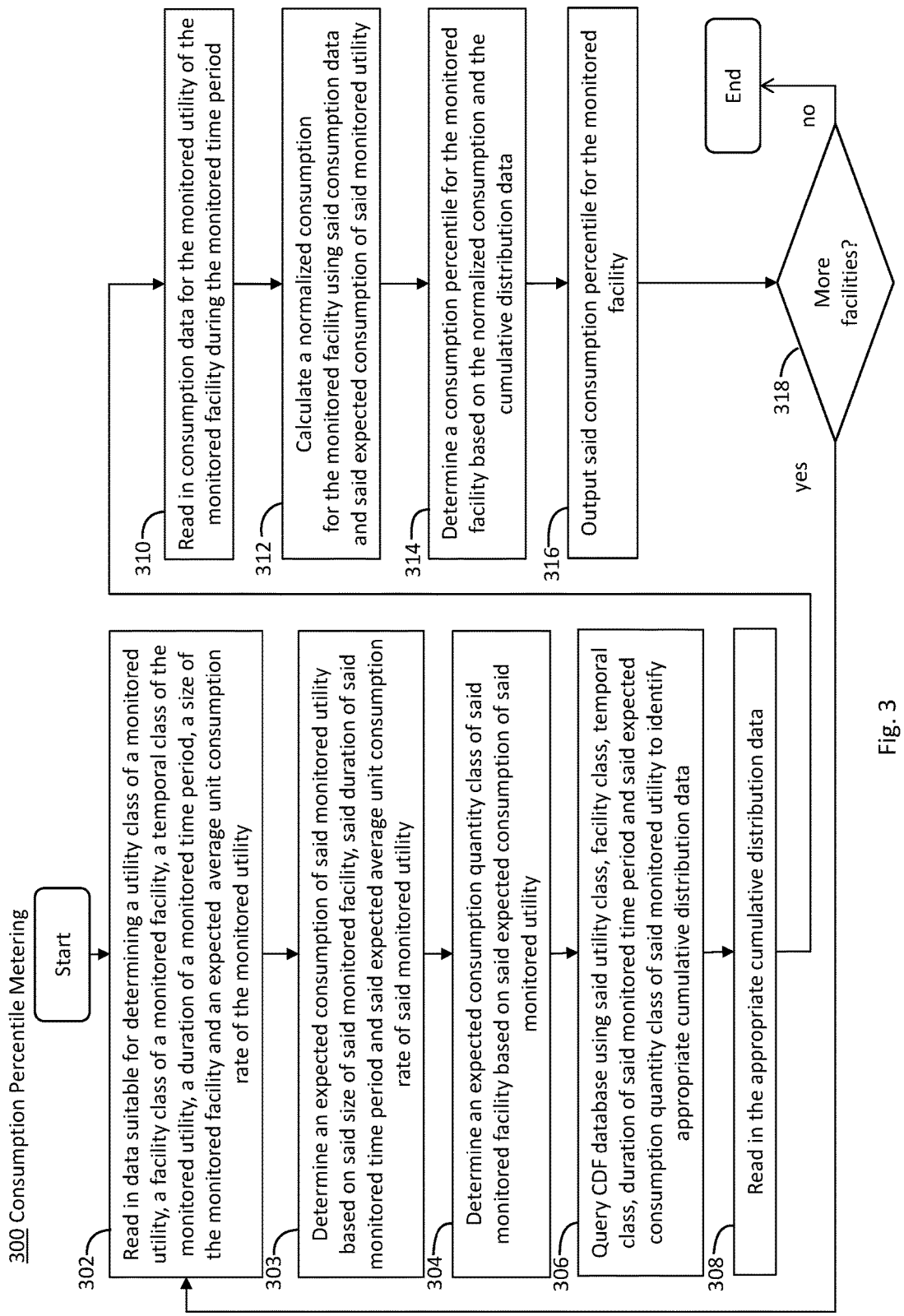
FIG. 3 is a flow chart of a method for consumption percentile metering.

FIG. 3 is a flow chart 300 of an exemplary method for consumption percentile metering. A consumption percentile meter (e.g. item 202 FIG. 2) reads in 302 data suitable for determining a utility class of a monitored utility, a facility class of a monitored facility, a temporal class of the monitored utility, a duration of a monitored time period, a size of the monitored facility and an expected average unit consumption rate of the monitored utility.

The consumption percentile meter then determines 303 an expected consumption of said monitored utility based on said size of said monitored facility, said duration of said monitored time period and said expected average unit consumption rate of said monitored utility.

The consumption percentile meter then determines 304 an expected consumption quantity class of said monitored facility based on said expected consumption of said monitored utility.

The consumption percentile meter then queries 306 a cumulative distribution (CDF) database using said utility class, facility class, temporal class, duration of said monitored time period and said expected consumption quantity class of said monitored utility to identify appropriate cumulative distribution data. As described above, the appropriate cumulative distribution data is based on data from monitored reference facilities in the same utility class, facility class, temporal class and expected consumption quantity class as the monitored facility.

The consumption percentile meter then reads in 308 the appropriate cumulative distribution data.

The consumption percentile meter then reads in 310 consumption data for the monitored utility of the monitored facility for the monitored time period. A person of ordinary skill will understand that the consumption percentile meter could alternatively read in the consumption data prior to executing steps 302 to 308 or during the execution of steps 302 to 308.

The consumption percentile meter then calculates 312 a normalized consumption for the monitored facility using said consumption data and said expected consumption of said monitored utility.

The consumption percentile meter then determines 314 a consumption percentile for the monitored facility based on the normalized consumption and the cumulative distribution data.

The consumption percentile meter then outputs 316 the consumption percentile for the monitored facility.

If the consumption percentile meter is monitoring more than one facility, the consumption percentile meter may check 318 to see if more facilities need to be monitored and then begin the process again. The consumption percentile meter may also multiplex between facilities if their monitored time periods overlap so that multiple facilities can be monitored during said overlapping monitored time periods.

Figure 4:
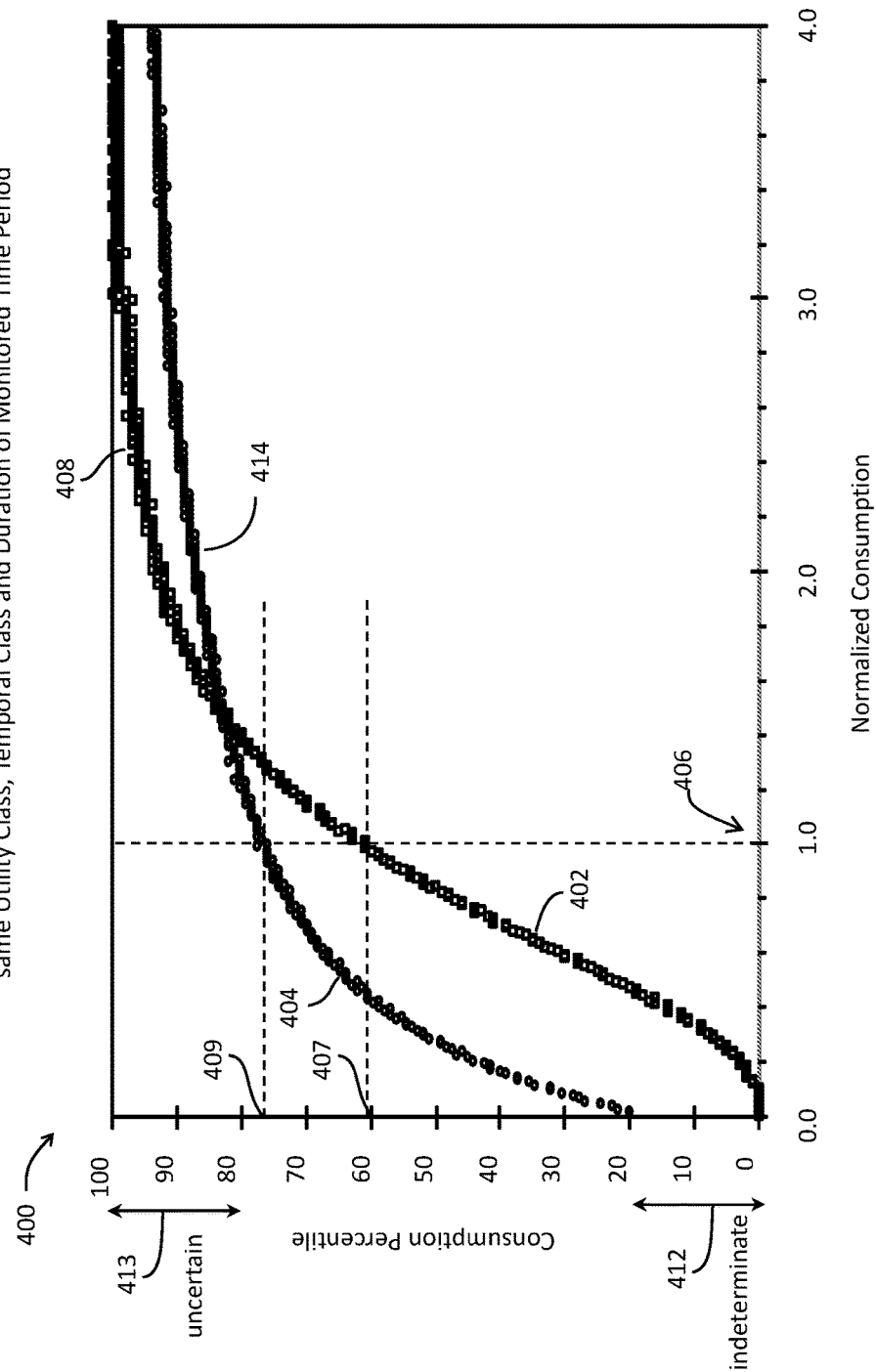
FIG. 4 is a graph comparing cumulative distributions of facilities in different expected consumption quantity classes.

Cumulative Distributions for Facilities of Different Expected Consumption Quantity Classes FIG. 4 is a graph 400 comparing cumulative distributions of reference facilities in the same utility class, temporal class, and duration of monitored time periods but in different expected consumption quantity classes. The utility class is "lost wages and medical expenses due to on-the-job injuries". The temporal class is "randomly initiated events". The duration of the monitored time periods is one year. Cumulative distributions for a small expected consumption quantity class 404 and a large expected consumption quantity class 402 are shown. This data is based on Table M.

The cumulative distribution data for the large expected consumption quantity class has a moderately long tail 408. The moderately long tail increases the average of the cumulative distribution so that a facility with a normalized consumption of 1.0 (item 406) has a consumption percentile of about 60 (item 407). This means that 60% of the reference facilities used to determine the cumulative distribution data had a normalized consumption that was less than the average for all of the reference facilities.

The cumulative distribution data for the small expected consumption quantity class has a very long tail 414. For this expected consumption quantity class, a monitored facility that has a normalized consumption of 1.0 would have a consumption percentile of about 78 (item 409). This means that 78% of the reference facilities in this class have a normalized consumption that is less than average.

Another characteristic of the cumulative distribution data for the small expected consumption quantity class is that 20% of the facilities have zero normalized consumption.

This corresponds to no accidents during a one year monitored time period. Facilities with zero normalized consumption have an indeterminate consumption percentile (item 412) between 0 and 20.

Another characteristic of the cumulative distribution data for the small expected consumption quantity class is that there is a region of uncertain consumption percentiles 413. This may be due to uncertainties in the normalized consumption of a monitored facility. As described in more detail below, one source of uncertainty is utility consumption that occurs in a tail period after the end of a monitored time period that is nonetheless attributable to the consumption of the monitored utility during the monitored time period. Ranges of indeterminate and uncertain consumption percentiles can impact billing methods based on consumption percentile.

Billing Methods Based on Consumption Percentile

Figure 5:
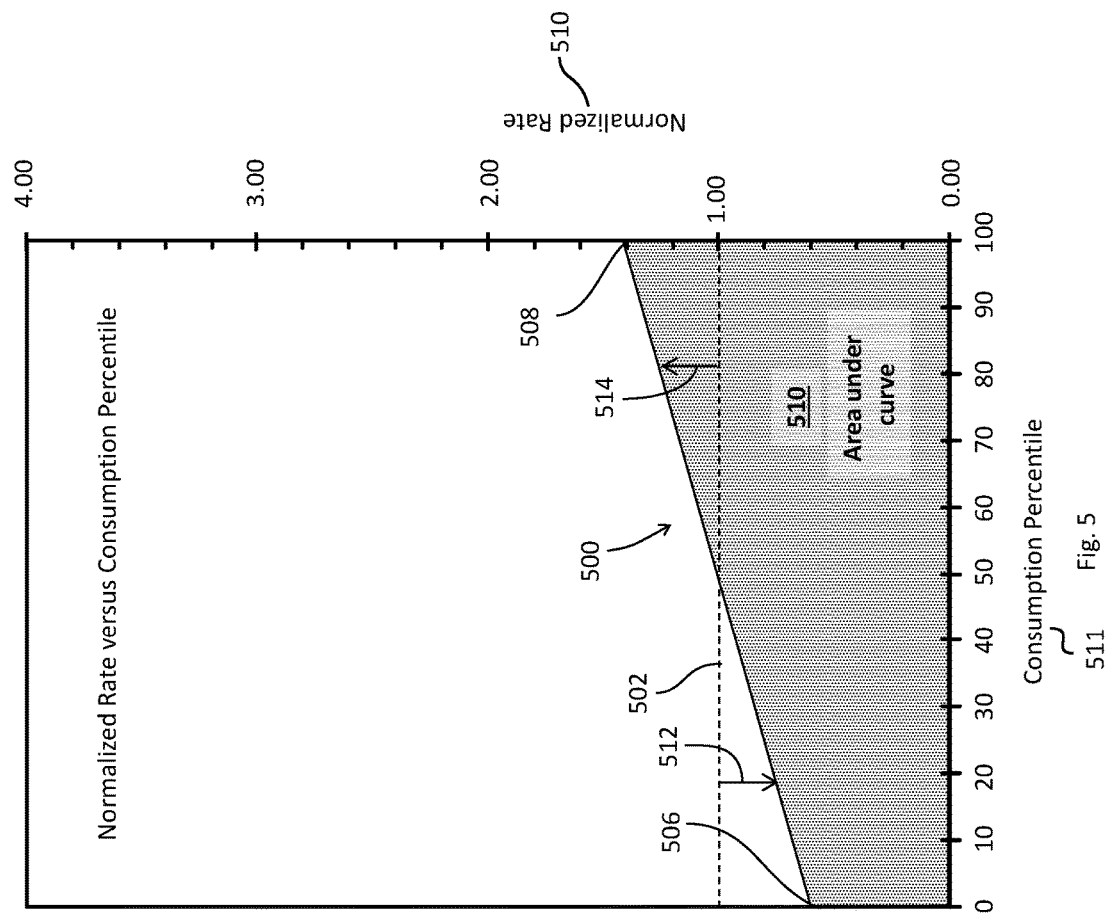
FIG. 5 is a graph of an exemplary normalized rate curve versus consumption percentile.

Billing methods for utilities consumed by a monitored facility can be based on consumption percentile. Said billing methods may be implemented on said computerized facility billing module 260 (FIG. 2). FIG. 5 shows a graph 500 of an exemplary normalized billing rate 510 versus consumption percentile 511. This is referred to herein as a "normalized rate curve". The normalized billing rate starts out at a minimum value (item 506) for a consumption percentile of 0 and increases linearly to a maximum value (item 508) at a consumption percentile of 100. The amount charged for the utility is set equal to the normalized billing rate times the expected consumption for the monitored utility times the unit price of the monitored utility. As described above, the expected consumption of the monitored utility is the expected average unit consumption rate of the monitored utility times the size of the monitored facility times the duration of the monitored time period.

A billing method based on consumption percentile has advantages for facilities that have fluctuations in utility consumption that are both partially in control of the facility and partially out of control of the facility. For example, a facility with a backup electric generator cannot control the weather or other external factors that could lead to a loss of electric power and hence consumption of fuel for said backup generator. The facility does have control, however, of the size of the backup generator and hence which systems will stay powered within the facility in the event of a loss of electric power. With percentile consumption billing, a facility with good practices relative to reference facilities will have a lower consumption percentile and hence pay less. This will provide incentive to maintain best practices. On the other hand, even if a facility has best practices, it still might occasionally experience an unusually high number of electric power losses and hence have very high backup fuel consumption. With percentile consumption billing, said facility will be protected against excessively high utility costs since its consumption percentile is capped at 100. This leads to a capped charge no matter how high the actual consumption is.

In order to make sure that the supplier of the utility receives enough payment for the consumed utility from all supplied facilities, the area 510 under the curve 500 of normalized billing rate versus consumption percentile should be at least 100 or greater. This corresponds to an area under the curve of 1.0 or greater if the units of consumption percentile are fractional (i.e. 0 to 1.0).

An alternative billing method is to charge a facility for the facility's expected consumption 502 prior to a monitored time period. At the end of the monitored time period, the consumption percentile is determined from the monitored utility consumption and then used to determine a refund 512 or surcharge 514 to be levied on the facility. An example of this type of alternative billing method is described below with reference to FIG. 9.

Figure 6:
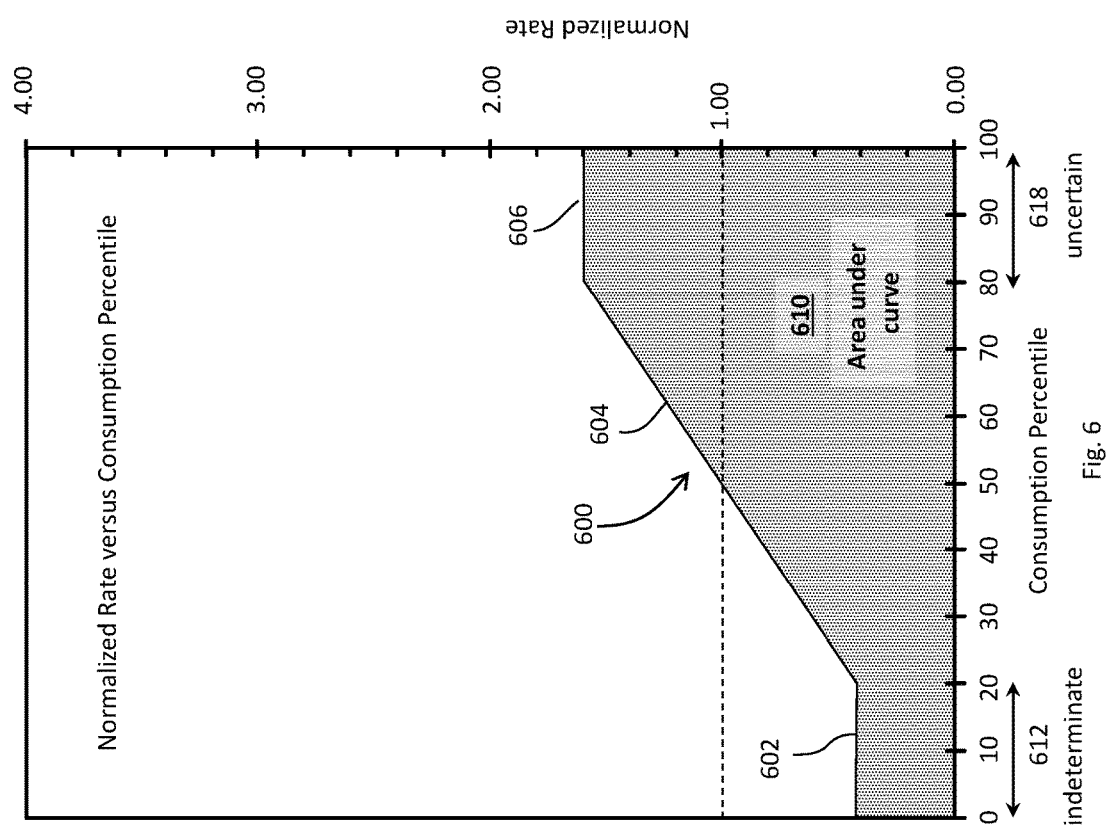
FIG. 6 is a graph of an exemplary normalized rate curve versus consumption percentile.

FIG. 6 shows a different normalized billing rate curve 600 percentile with low 602 and high 606 plateaus. Plateaus may be provided in consumption percentile ranges that are either indeterminate 612 or uncertain 618. Plateau regions for ranges of indeterminate consumption percentile are useful since the actual consumption percentile in said ranges cannot be determined. Thus a charge will be constant over a range of indeterminate consumption. Plateau regions in ranges of uncertain consumption percentile are useful to minimize billing disputes with facilities where the accuracy of the utility consumption data may be in dispute. The charge will be constant over the range of uncertain consumption percentile so there is no need to dispute the accuracy of the utility consumption data.

The low plateau and high plateau regions are connected by a linear region 604 over a range of consumption percentiles. The parameters of the normalized rate curve, such as plateau values, consumption percentile ranges, and slope of linear region, can be selected so that the area (item 610) under the curve is set to 100 or greater. The same linear region can be used for a plurality of facilities wherein each facility is associated with a different cumulative distribution.

Figure 7:
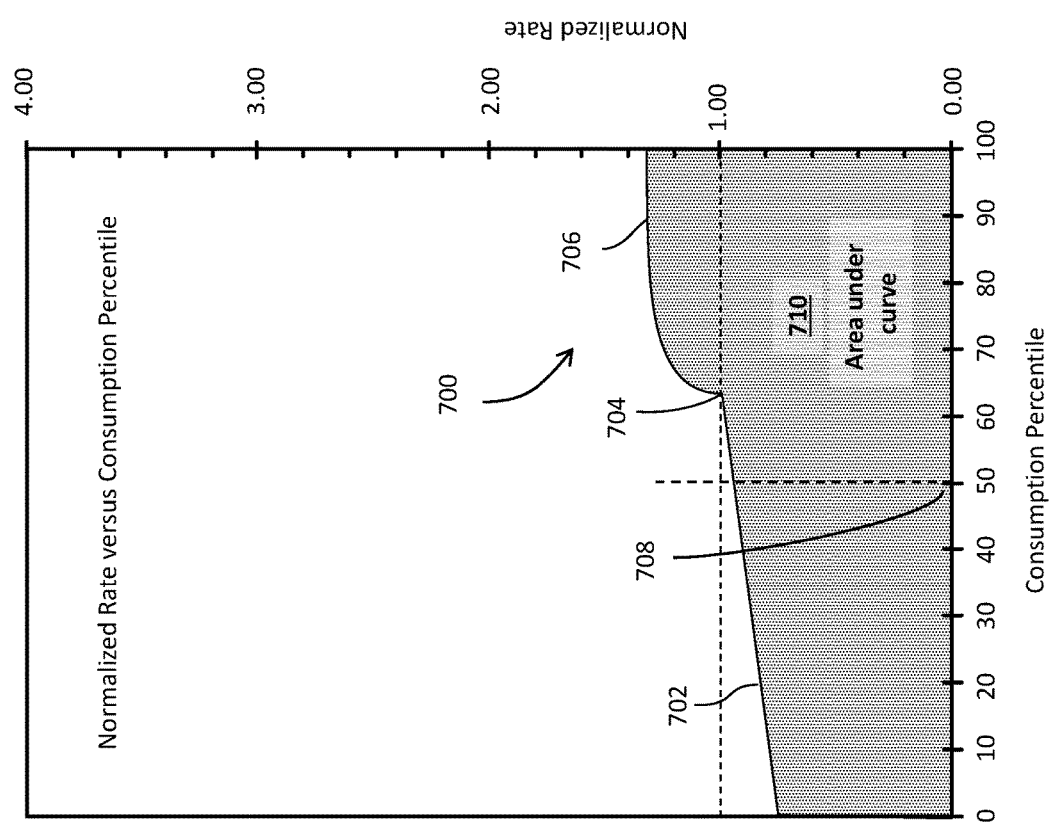
FIG. 7 is a graph of an exemplary normalized rate curve versus consumption percentile.

FIG. 7 shows a different normalized billing rate curve 700 that has a first linear region 702 followed by a sharp increase 704 which tapers into a plateau 706. The sharp increase is at a consumption percentile that is above the median (item 708). In this example, the sharp increase occurs at a consumption percentile of about 65. Thus 65% of the facilities will get a discount relative to the average. Facilities with a consumption percentile above 65, however, are subject to significant surcharge. The surcharge is curved so that even if a facility has a consumption percentile above 65, there is still incentive to not go higher. The final plateau makes sure that no facility is excessively charged even if its normalized consumption is quite high.

Any number of alternative normalized billing rate curves can be designed. A computer implemented system can be provided to allow a designer to create alternative designs. The computerized design system may automatically adjust curve parameters so that the area under the curve 710 is 100 or some greater value. The curves may be displayed on a screen with provision made for the designer to modify the curve. A greater value than 100 for the area under the curve may be used if profitability, return on investment, or time value of money (e.g. extended payment plans) are built into the billing method. An area under the curve of less than 100 may be appropriate in certain circumstances, such as designing systems for introductory offers.

Anticipated changes in facility behavior in response to different billing rate designs may be incorporated into the design system so that feedback between the billing rate design and the impact of said changes in facility behavior on the cumulative distributions can be modeled. This feedback on the cumulative distributions can occur when data from monitored facilities is fed back into the cumulative distribution database as described with reference to item 205 of FIG. 2.

A normalized rate curve can improve the physical performance of a computerized billing system. The same normalized rate curve can be used for different cumulative distributions. Thus the computation time to calculate a billing rate is reduced when the same system has to bill for a plurality of cumulative distributions that are required for a plurality of monitored facilities.

Consumption Percentile Forecasting

Figure 8:
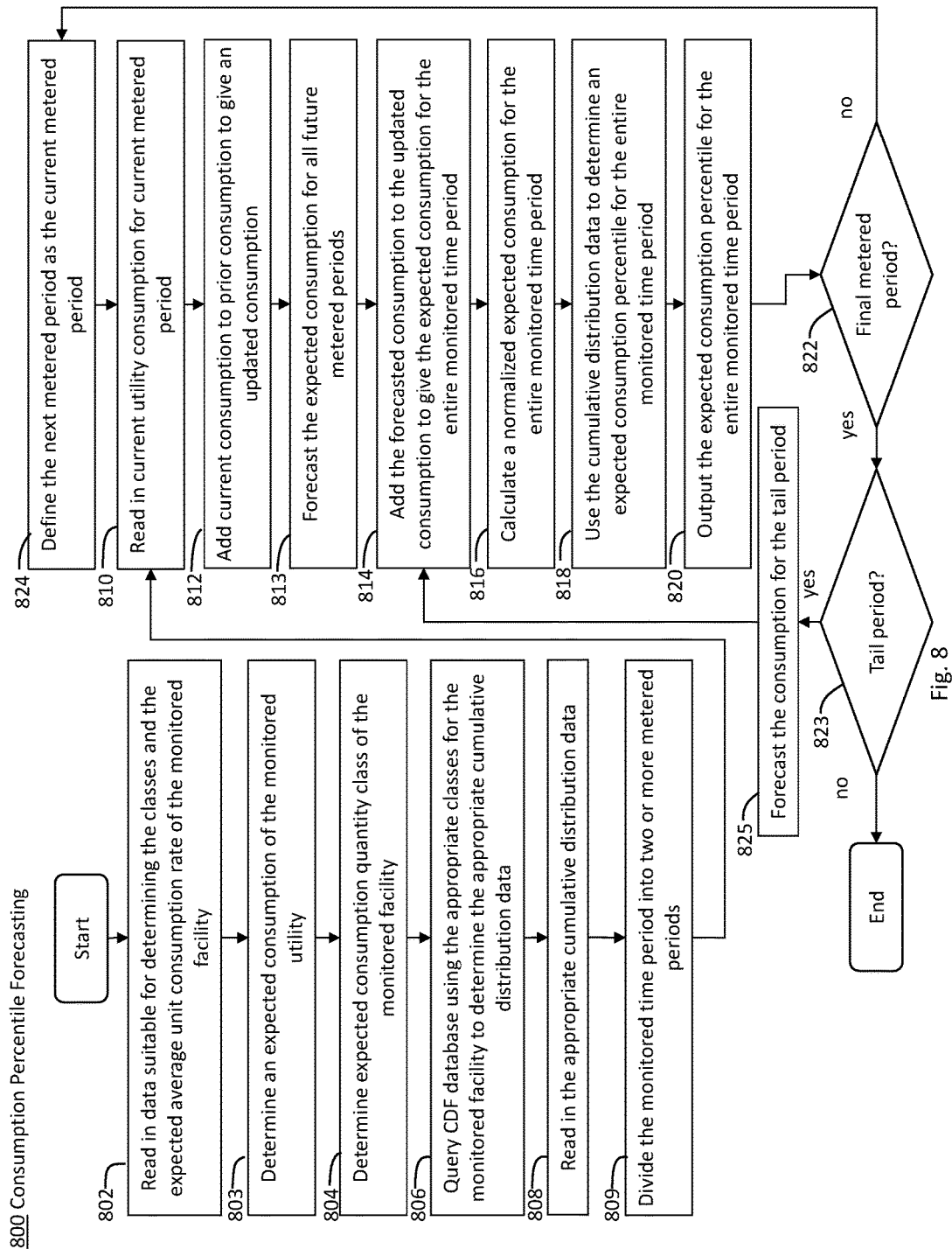
FIG. 8 is a flow chart of a method for consumption percentile forecasting.

FIG. 8 is a flow chart for a computer implemented method 800 of consumption percentile forecasting using a statistical facility monitor. A facility is to have a utility monitored for a monitored time period using a consumption percentile meter. The monitored time period, for example, might be three years. The facility, however, will be billed for intermediate payments during the monitored time period. This avoids the facility being presented with a large bill at the end of the monitored time period. In order to provide intermediate billing of the expected final charge, however, the system for statistical facility monitoring must provide intermediate forecasts of what the expected consumption percentile will be at the end of the monitored time period.

The system for statistical facility monitoring first reads in 802 data suitable for determining the classes and the expected average unit consumption rate of the monitored facility. The data suitable for classes is described in more detail above with reference to item 302 of FIG. 3.

The system then determines 803 an expected consumption of the monitored utility. This is described in more detail with reference to item 303 of FIG. 3.

The system then determines 804 an expected consumption quantity class of the monitored facility. This is described in more detail with reference to item 304 of FIG. 3.

The system then queries 806 a CDF database using the appropriate classes for the monitored facility to determine the appropriate cumulative distribution data. This is described in more detail with reference to item 306 of FIG. 3.

The system then reads in 808 the appropriate cumulative distribution data. This is described in more detail with reference to item 308 of FIG. 3.

The system then divides 809 the monitored time period into two or more metered periods.

The system then reads in 810 the current utility consumption for the current metered period.

At the end of the current metered period, the system will add 812 the current consumption to any prior consumption for prior metered periods to give an updated consumption.

The system will then forecast 813 the expected consumption for all future metered periods that have not been monitored yet. The forecast may be the expected average unit consumption rate of the monitored utility times the size of the monitored facility times the duration of the future metered periods. The system, therefore, assumes that the monitored facility will have average consumption for future metered periods irrespective of the level of monitored consumption up to that point. The system may alternatively adjust the expected average unit consumption rate used for forecasting future consumption based on the level of monitored consumption up to that point. If the monitored consumption is below average, the expected average unit consumption rate for future metered periods may be reduced. If the monitored consumption is above average, the expected average unit consumption rate for future metered periods may be increased. In the insurance industry, the factor used to make this kind of adjustment is known as an "experience modifier". A similar factor can be applied to the hospital backup generator system as described above. A similar factor can also be applied to any physical system with randomly initiated utility consumption.

The system will then add 814 the forecasted consumption to the updated consumption to give the expected consumption for the entire monitored time period.

The system will then calculate 816 a normalized expected consumption for the entire monitored time period.

The system will then use 818 the cumulative distribution data to determine an expected consumption percentile for the entire monitored time period.

The system will then output 820 the expected consumption percentile for the entire monitored time period.

The system will then determine 822 if the current metered period is the final metered period. If not, then the system defines 824 the next metered period as the current metered period and repeats steps 810 to 822.

Referring back to step 822, when the current metered period is the final metered period, the system may then check 823 to see if there is a tail period. A tail period can occur when there is expected utility consumption that will occur after the end of the monitored time period. As described above, a backup generator might run for a period of time that goes beyond the monitored time period and into a tail period. When it does, the system will forecast 825 the consumption for the tail period. The system will then return to step 814 and add the forecasted consumption for the tail period to the updated consumption to give the expected consumption for the entire monitored time period. The consumption percentile meter, therefore, may provide a consumption percentile for a monitored time period even though there is future unmeasured consumption that will occur in a tail period. This is especially useful for billing systems where there might be very long tail periods, such as workers' compensation insurance. As described above with reference to the plateau region 606 of FIG. 6, a normalized billing rate curve can be constructed so that it is insensitive to uncertainties in measured consumption. Billing rate curves with plateau features, therefore, may be particularly useful when there are long tail periods and hence significant uncertainties in a particular monitored facility's future consumption.

Referring back to step 823, when there is no additional tail period, the system ends or proceeds to monitor another facility. Similar to the process described in FIG. 3, the system may multiplex between monitored facilities if their monitored time periods overlap.

Intermediate Charges

Forecasted consumption percentiles can be used by a billing system for intermediate billing of a monitored utility. The basic idea is to divide a monitored time period into two or more metered periods. At the beginning of each metered period, a forecast is made of what the consumption percentile will be at the end of the monitored time period. The forecasted consumption percentile is used to determine a forecasted total charge for the monitored utility over the entire monitored time period. The billing system then determines an intermediate charge for the current metered period based on the duration of the current metered period, the time left in the monitored time period and any earlier intermediate charges already paid. This is illustrated in FIG. 9.

Figure 9:
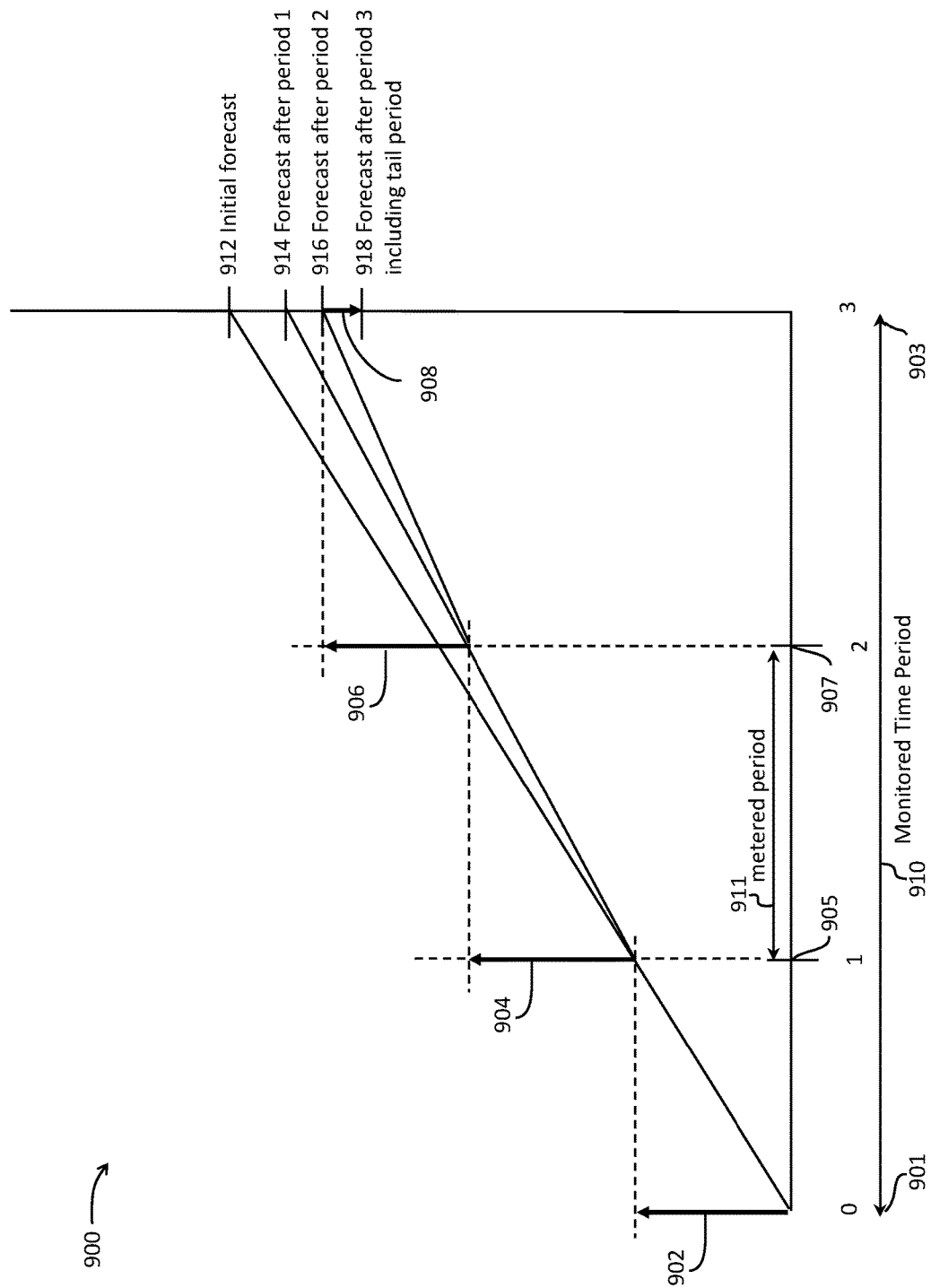
FIG. 9 is a graph of forecasting charges based on intermediate forecasted consumption percentiles.

FIG. 9 illustrates 900 a method for intermediate billing. Total forecasted charges for a monitored utility for an entire monitored time period (e.g. items 912, 914, 916 and 918) are shown versus time. A monitored time period 910 is subdivided into sequential metered periods (e.g. item 911). The monitored time period has a beginning 901 and an end 903. Each metered period also has a beginning (e.g. item 905) and an end (e.g. item 907). In this example, there are three metered periods. Any number of metered periods, however, can be used. The metered periods do not have to be the same duration but can be any duration appropriate to the monitored utility.

At or before the beginning of the first metered period, an initial forecast is made of the total expected charge 912 for the monitored utility over the entire monitored time period. The initial forecast of the total expected charge may be based on an initial forecasted value of what the consumption percentile will be for the entire monitored time period. An initial forecasted value of 50 (i.e. average consumption) is suitable. A normalized billing rate may then be determined using the initial forecasted value of the consumption percentile and a normalized billing rate curve. One can use one of the normalized billing rate curves illustrated in FIGS. 5 to 7 or any other normalized billing rate curve subject to the conditions set forth above (e.g. area under the curve of about 100). The initial forecast of the total expected charge for the monitored utility for the monitored time period, therefore, is the normalized billing rate times the expected average unit consumption rate of the monitored utility times the size of the monitored facility times the duration of the monitored time period times the unit price of the monitored utility.

The system then calculates an intermediate charge 902 for the upcoming first metered period. The intermediate charge is equal to the initial forecast of the total expected charge 912 less any prior payments times the duration of the first metered period divided by the duration of all of the remaining metered periods in the monitored time period. The remaining metered periods include the first metered period. In this example, if the initial forecast of the total expected charge was $100, the intermediate charge for the upcoming first metered period would be about $33.

At the end of the first metered period, the process is repeated for the second metered period. An updated forecast is made of the total expected charge 914 at the end of the monitored time period. The updated forecast of the total expected charge is based on an updated forecast of the consumption percentile for the entire monitored time period. The updated forecast of the consumption percentile is based on an updated forecast of the total consumption at the end of the monitored time period. The updated forecast of the total consumption at the end of the monitored time period is equal to the measured utility consumption as of the end of the first metered period plus the expected consumption for the remaining metered periods.

In the example shown, the updated forecast at the end of metered period 1 of the total expected charge 914 for the entire monitored time period has fallen relative to the initial forecast of the total expected charge 912 for the entire monitored time period. This indicates that the monitored facility had lower than average utility consumption during the first metered period. The intermediate charge 904 for the second metered period, therefore, will be less than the intermediate charge 902 for the first metered period. Thus the monitored facility has an immediate reward for having less than expected utility consumption during the first metered period.

The process is repeated at the end of metered period 2. The total expected charge 916 for the entire monitored time period has again fallen. This again indicates that the measured utility consumption during metered period 2 was less than average. The intermediate charge 906 for period 3, therefore, is less than the intermediate charge for period 2.

At the end of the monitored time period, a forecast is made of the expected consumption during a tail period. This gives a final value of the consumption percentile for the entire metered period and hence a final charge 918 for the monitored utility for the entire monitored time period. In this example, the forecasted utility consumption for the tail period was less than average so a refund 908 is given to the monitored facility.

In some situations it may be desirable to avoid giving refunds if only to simplify the computer systems used to implement the billing process. This can be achieved by reducing the earlier intermediate charges so that it is expected that even if a monitored facility consistently has lower than average consumption, there will still be a final charge. This can benefit the facility since charges are deferred.

CONCLUSION

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out this invention.

We claim:

1. A computer implemented statistical facility monitor directed to the practical application of quantitatively measuring a consumption percentile of a monitored utility for a monitored facility wherein said statistical facility monitor comprises a computer implemented consumption percentile meter comprising an input device, a computer screen and a digital processor wherein said computer implemented consumption percentile meter is configured to:
   a) read in by said input device data suitable for determining a utility class of said monitored utility, a facility class of said monitored facility, a temporal class of the monitored utility, a duration of a monitored time period, a size of the monitored facility and an expected average unit consumption rate of the monitored utility;
   b) determine by said digital processor an expected consumption of said monitored utility based on said size of said monitored facility, said duration of said monitored time period and said expected average unit consumption rate of said monitored utility;
   c) determine by said digital processor an expected consumption quantity class of said monitored facility based on said expected consumption of said monitored utility;
   d) query by said digital processor a cumulative distribution (CDF) database using said utility class, facility class, temporal class, duration of said monitored time period and said expected consumption quantity class of said monitored utility to identify appropriate cumulative distribution data wherein said appropriate cumulative distribution data is based on data from a plurality of monitored reference facilities in the same utility class, facility class, temporal class and expected consumption quantity class as the monitored facility;
   e) read in by said input device said appropriate cumulative distribution data;
   f) read in by said input device from said monitored facility, consumption data for the monitored utility for the monitored time period;

g) calculate by said processor a normalized consumption for the monitored facility using said consumption data and said expected consumption of said monitored utility;

h) determine by said processor a consumption percentile for the monitored facility based on the normalized consumption and the cumulative distribution data; and i) display on said computer screen, the consumption percentile for the monitored facility.

2. The statistical facility monitor of claim 1 wherein said cumulative distribution data is based on 100 or more of said reference facilities.

3. The statistical facility monitor of claim 1 wherein said utility class is one or more of energy, materials, labor, capital costs or monetary expenses.

4. The statistical facility monitor of claim 1 wherein said temporal class is one or more of steady consumption, periodic consumption, randomly initiated events, or finite state machine cycle.

5. The statistical facility monitor of claim 4 wherein said randomly initiated event is an accident within said monitored facility and said utility consumption data comprises losses due to said accident.

6. The statistical facility monitor of claim 1 which further comprises a computer implemented facility billing module configured to provide a charge for said utility based on said consumption percentile for said monitored facility.

7. The statistical facility monitor of claim 6 wherein said monitored time period comprises a beginning and an end and wherein said monitored time period is subdivided into sequential metered periods each comprising a beginning and an end.

8. The statistical facility monitor of claim 7 wherein said computer implemented facility billing module is configured to automatically provide an intermediate charge at the beginning of a current metered period wherein said intermediate charge is based on a forecasted consumption percentile for said monitored facility at said end of said monitored time period.

9. The statistical facility monitor of claim 8 wherein said forecasted consumption percentile for said monitored facility is based on a prior consumption for all of said metered periods prior to said beginning of said current metered period and a forecasted consumption for all of said metered periods subsequent to said beginning of said current metered period.

10. The statistical facility monitor of claim 9 wherein said forecasted consumption percentile for said monitored facility is based on a forecasted consumption of said utility for a tail period that occurs after said end of said monitored time period.

11. The statistical facility monitor of claim 6 wherein said charge has a linear relationship to said consumption percentile for said monitored facility over a range of consumption percentiles.

12. The statistical facility monitor of claim 11 which is adapted to monitor a plurality of facilities and wherein:

a) each facility is associated with a different cumulative distribution; and b) said linear relationship is used for each of said different cumulative distributions.

13. The statistical facility monitor of claim 6 wherein there is a range of indeterminate consumption percentiles for said cumulative distribution and wherein said charge is a constant over said range of indeterminate consumption percentiles.

14. The statistical facility monitor of claim 1 wherein at least a portion of said utility consumption data is manually entered into said statistical facility monitor.

15. The statistical facility monitor of claim 1 wherein:

a) said expected consumption quantity class comprises a minimum and a maximum; and b) the ratio of said maximum to said minimum is in the range of 1.08 to 1.6.

16. The statistical facility monitor of claim 15 wherein:

a) said temporal class is randomly initiated events;

b) said randomly initiated events have a probability of occurring per unit time;

c) said randomly initiated events have a distribution of magnitudes of consumption of said utility;

d) said distribution of magnitudes has an average value; and e) said expected consumption of said monitored utility is equal to said probability of occurring per unit time, times said average value times said duration of said monitored time period.

17. The statistical facility monitor of claim 16 wherein said probability and said distribution of magnitudes is based on said labor class.

18. The statistical facility monitor of claim 1 wherein said monitored facility comprises one or more of a plurality of buildings, regions within buildings or outdoor locations.

19. The statistical facility monitor of claim 1 wherein said facility class is an industrial class.

* * * * *